US012043550B2

(12) United States Patent
Golden et al.

(10) Patent No.: US 12,043,550 B2
(45) Date of Patent: *Jul. 23, 2024

(54) CMAS RESISTANT THERMAL BARRIER COATING SYSTEM

(71) Applicants: Rolls-Royce Corporation, Indianapolis, IN (US); Rolls-Royce North American Technologies, Inc., Indianapolis, IN (US)

(72) Inventors: Robert Alexander Sean Golden, Indianapolis, IN (US); Adam Lee Chamberlain, Indianapolis, IN (US); Matthew R. Gold, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 310 days.

This patent is subject to a terminal disclaimer.

(21) Appl. No.: 17/350,663

(22) Filed: Jun. 17, 2021

(65) Prior Publication Data
US 2021/0395099 A1 Dec. 23, 2021

Related U.S. Application Data

(60) Provisional application No. 63/041,580, filed on Jun. 19, 2020.

(51) Int. Cl.
| | | |
|---|---|---|
| C01B 33/20 | (2006.01) | |
| C23C 28/00 | (2006.01) | |
| F01D 5/14 | (2006.01) | |
| F01D 9/04 | (2006.01) | |
| F01D 25/14 | (2006.01) | |

(52) U.S. Cl.
CPC .......... *C01B 33/20* (2013.01); *C23C 28/347* (2013.01); *F01D 5/147* (2013.01); *F01D 9/041* (2013.01); *F01D 25/145* (2013.01); *C01P 2002/30* (2013.01); *C01P 2006/32* (2013.01); *F05D 2220/32* (2013.01); *F05D 2230/31* (2013.01); *F05D 2240/12* (2013.01); *F05D 2240/30* (2013.01); *F05D 2260/231* (2013.01)

(58) Field of Classification Search
None
See application file for complete search history.

(56) References Cited

U.S. PATENT DOCUMENTS

| 9,890,089 | B2 | 2/2018 | Kirby et al. |
|---|---|---|---|
| 2006/0014029 | A1 | 1/2006 | Saak et al. |
| 2006/0078750 | A1 | 4/2006 | Zhu et al. |
| 2006/0121293 | A1 | 6/2006 | Boutwell et al. |
| 2010/0080984 | A1 | 4/2010 | Lee |
| 2010/0159261 | A1 | 6/2010 | Kirby et al. |
| 2011/0033630 | A1 | 2/2011 | Naik et al. |
| 2011/0203281 | A1 | 8/2011 | Sarrafi-Nour et al. |
| 2013/0136915 | A1 | 5/2013 | Naik |
| 2013/0189531 | A1 | 7/2013 | Lee |
| 2014/0255680 | A1 | 9/2014 | Lee et al. |
| 2014/0261080 | A1 | 9/2014 | Lee |
| 2016/0003092 | A1 | 1/2016 | Chamberlain et al. |
| 2017/0022113 | A1 | 1/2017 | Opila |
| 2017/0044930 | A1 | 2/2017 | Luthra et al. |
| 2018/0037515 | A1 | 2/2018 | Matsumoto et al. |
| 2018/0363476 | A1 | 12/2018 | Hafner et al. |
| 2018/0370862 | A1 | 12/2018 | Kirby et al. |
| 2019/0284673 | A1 | 9/2019 | Landwehr et al. |
| 2020/0123071 | A1 | 4/2020 | Ndamka et al. |
| 2020/0199027 | A1 | 6/2020 | Chamberlain et al. |
| 2021/0396150 | A1 | 12/2021 | Golden et al. |

FOREIGN PATENT DOCUMENTS

| EP | 1044947 | A2 | 10/2000 |
|---|---|---|---|
| EP | 2918698 | A1 | 9/2015 |
| EP | 3130577 | A1 | 2/2017 |
| EP | 3243809 | A1 | 11/2017 |
| EP | 3243925 | A1 | 11/2017 |
| EP | 3670481 | A1 | 6/2020 |
| WO | 2020047278 | A1 | 3/2020 |

OTHER PUBLICATIONS

Office Action from U.S. Appl. No. 16/723,675 dated Feb. 8, 2023, 11 pp.
Tian et al., "Theoretical and experimental determination of the major thermo-mechanical properties of RE2SiO5 (RE=Tb, Dy, Ho, Er, Tm, Yb, Lu, and Y) for environmental and thermal barrier coating applications", Journal of the European Ceramic Society, vol. 36, No. 1, Jan. 2016, pp. 189-202.
Turcer et al., "Towards multifunctional thermal environmental barrier coatings (TEBCs) based on rare-earth pyrosilicate solid-solution ceramics", Scripta Materialia, vol. 154, May 2018, 7 pp.
Office Action from U.S. Appl. No. 17/350,827 dated Sep. 9, 2022, 21 pp.

(Continued)

*Primary Examiner* — Kim S. Horger
(74) *Attorney, Agent, or Firm* — Shumaker & Sieffert, P.A.

(57) ABSTRACT

An article may include a substrate and a coating system on the substrate. The coating system may include a thermal barrier coating (TBC) layer and a CMAS resistant layer on the TBC layer. The CMAS layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

15 Claims, 5 Drawing Sheets

(56) References Cited

OTHER PUBLICATIONS

Richards, "Ytterbium Silicate Environmental Barrier Coatings," Dissertation Presented to the Faculty of the School of Engineering and Applied Science University of Virginia, May 2015, 322 pp.

Rost et al., "Entropy-Stabilized Oxides," Nature Communications, Sep. 29, 2015, 8 pp.

Turcer et al., "Towards Multifunctional Thermal Environmental Barrier Coatings (TEBCs) Based on Rare-Earth Pyrosilicate Solid-Solution Ceramics," Scripta Materialia, vol. 154, May 20, 2018, 7 pp.

Costa et al., "Mass Spectrometric Measurements of the Silica Activity in the Yb2O3-SiO2 System and Implications to Assess the Degradation of Silicate-Based Coatings in Combustion Environments," Journal of the European Ceramic Society, Aug. 2015, 9 pp.

Han et al., "Study on Water Vapor Corrosion Resistance of Rare Earth Monosilicates RE2SiO5 (RE [ Lu, Yb, Tm, Er, Ho, Dy, Y, and Sc) From First-Principles Calculations," Elsevier, vol. 4, Oct. 10, 2018, 13 pp.

Zheng et al., "Theoretical and Experimental Determination of the Major Thermo-Mechanical Properties of RE2SiO5 (RE=Tb, Dy, Ho, Er, Tm, Yb, Lu, and Y) for Environmental and Thermal Barrier Coating Applications," Journal of the European Ceramic Society, vol. 36, Jan. 2016, pp. 189-202.

He, "Rapid Thermal Conductivity Measurement with a Hot Disk Sensor Part 1. Theoretical Considerations," Thermochimica Acta, vol. 436, No. 1, Oct. 2005, pp. 122-129.

Cahill, "Thermal Conductivity Measurement From 30 to 750 K: the 3£0 Method," Review of Scientific Instruments, vol. 61, No. 2, Feb. 1990, pp. 802-808.

Hull, "Accuracy, Precision, and Confidence in X-ray Fluorescence for Positive Material Identification," The NDT Technician, vol. 16, No. 1, Jan. 2017, 6 pp.

Lee et al., "Rare Earth Silicate Environmental Barrier Coatings for SiC/SiC Composites and Si3N4 Ceramics," Journal of the European Ceramic Society, vol. 25, Dec. 2005, pp. 1705-1715.

Nan et al., "Effective Thermal Conductivity of Particulate Composites with Interfacial Thermal Resistance," Journal of Applied Physics, vol. 81, No. 10, May 15, 1997, pp. 6692-6699.

Sun et al., "Thermal Properties of Single-Phase Y2SiO5," Journal of the European Ceramic Society, vol. 29, Mar. 2009, pp. 551-557.

Gild et al., "High-Entropy Fluorite Oxides," Journal of the European Ceramic Society, vol. 38, Apr. 2018, pp. 3578-3584.

Gild et al., "A High-Entropy Silicide: (Mo0.2Nb0.2Ta0.2Ti0.2W0.2)Si2," Journal of Materiomics, Version 1.0, Feb. 3, 2019, 14 pp.

Ramasamy et al., "EBC Development for Hot-Pressed Y2O3/Al2O3 Doped Silicon Nitride Ceramics," Materials Science and Engineering: A-Structural Materials Properties Microstructure and Processing, vol. 527, Aug. 20, 2010, 8 pp.

Hiu et al., "Phase Evolution of Reactive Sputtering Synthesized Holmium Silicate Coatings," Journal of the American Ceramic Society, vol. 102, Jul. 6, 2018, 8 pp.

Ridley et al., "Tailoring Thermal Properties of EBCs in High Entropy Rare Earth Monosilicates," Acta Materialia, Manuscript No. A-20-88, Jan. 6, 2020, 31 pp.

Ridley et al., "Tailoring Thermal Properties of Multi-Component Rare Earth Monosilicates," Acta Materialia, vol. 195, Aug. 2020, pp. 698-707.

Ochrombel et al. "Thermal Expansion of EB-PVD Yttria Stabilized Zirconia," Journal of the European Ceramic Society, vol. 30, No. 12, Sep. 2010, pp. 2491-2496.

Al Nasiri et al., "Thermal Properties of Rare-Earth Monosilicates for EBC on Si-Based Ceramic Composites," Journal of the American Ceramic Society, vol. 99, No. 2, Feb. 2016, pp. 589-596.

Response to Office Action dated Feb. 8, 2023 from U.S. Appl. No. 16/723,675, filed Jun. 8, 2023, 11 pp.

Final Office Action from U.S. Appl. No. 16/723,675 dated Oct. 31, 2022, 10 pp.

Response to Office Action dated Jul. 15, 2022 from U.S. Appl. No. 16/723,675, filed Oct. 17, 2022, 8 pp.

Office Action from U.S. Appl. No. 16/723,675 dated Jul. 15, 2022, 8 pp.

Final Office Action from U.S. Appl. No. 17/350,827 dated Mar. 1, 2023, 16 pp.

Response to Final Office Action dated Mar. 1, 2023 from U.S. Appl. No. 17/350,827, filed Jun. 1, 2023, 9 pp.

Response to Extended Search Report dated Aug. 26, 2021, from counterpart European Application No. 21179586.9 filed Jun. 20, 2022, 60 pp.

Extended Search Report from counterpart European Application No. 21179586.9, dated Aug. 26, 2021, 7 pp.

Final Office Action from U.S. Appl. No. 16/723,675 dated Aug. 8, 2023, 9 pp.

Office Action from U.S. Appl. No. 17/350,827 dated Jul. 28, 2023, 16 pp.

Response to Final Office Action dated Oct. 31, 2022 from U.S. Appl. No. 16/723,675, filed Jan. 3, 2023, 11 pp.

Response to Office Action dated Sep. 9, 2022 from U.S. Appl. No. 17/350,827, filed Dec. 9, 2022, 16 pp.

Ren Xiaomin et al: "Equiatomic quaternary (Yl/4Hol/4Erl/4Ybl/4)2Si05silicate: A perspective multifunctional thermal and environmental barrier coating material". Scripta Materialia. vol. 168. Apr. 24, 2019 (Apr. 24, 2019). pp. 47-50.

Tian Zhi Lin et al: "General trend on the phase stability and corrosion resistance of rare earth monosilicates to moltencalcium-magnesium-aluminosilicate at 1300oC". Corrosion Science. vol. 148. Mar. 1, 2019 (Mar. 1, 2019). pp. 281-292.

Response to Final Office Action dated Aug. 8, 2023 from U.S. Appl. No. 16/723,675, filed Nov. 8, 2023, 10 pp.

Advisory Action from U.S. Appl. No. 16/723,675 dated Dec. 8, 2023, 3 pp.

Response to Office Action dated Jul. 28, 2023 from U.S. Appl. No. 17/350,827, filed Dec. 28, 2023, 8 pp.

Notice of Allowance from U.S. Appl. No. 17/350,827 dated Jan. 24, 2024, 9 pp.

Final Office Action from U.S. Appl. No. 16/723,675 dated May 31, 2024, 11 pp.

Response to Office Action dated Feb. 20, 2024 from U.S. Appl. No. 16/723,675, filed May 20, 2024, 10 pp.

CMAS RESISTANT THERMAL BARRIER COATING SYSTEM

This application claims the benefit of U.S. Provisional Patent Application No. 63/041,580, filed Jun. 19, 2020. The entire content of this application is incorporated herein by reference.

TECHNICAL FIELD

The present disclosure generally relates to, in some examples, thermal barrier coating systems for high-temperature mechanical systems, such as gas turbine engines.

BACKGROUND

The components of gas turbine engines operate in severe environments. For example, the high-pressure turbine airfoils exposed to hot gases in commercial aeronautical engines typically experience surface temperatures of about 1000° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy, ceramic, or CMC substrates may be coated with a thermal barrier coating to reduce heat transfer from the external environment to the substrate, an environmental barrier coating to reduce exposure of the substrate to environmental species, such as oxygen, water vapor, or Calcia-Magnesia-Alumina Silicate (CMAS) containing materials, an abradable coating to improve a seal, or combinations thereof.

SUMMARY

In some examples, the disclosure describes articles, systems, and techniques relating to a thermal barrier coating (TBC) system on a substrate such as a superalloy substrate or other metallic substrate. The TBC system may include a TBC layer and a CMAS resistant layer on the TBC layer (e.g., directly or indirectly). The CMAS resistant layer may include a rare earth (RE) monosilicate composition including multiple RE metal cations. As will be described below, such a multi-cation RE monosilicate composition may allow for beneficial CMAS resistant properties by reacting with CMAS to form a primary phase as well as a RE apatite phase, e.g., during operation of the article within a high temperature environment. The multi-cation RE monosilicate composition may be tailored such that the RE apatite phase formed from the reaction with CMAS may be stable over the operating temperature range of the article (e.g., from room temperature to about 1500 degrees Celsius). In some examples, in this manner, the CMAS resistant layer may as a barrier that reduces infiltration of the CMAS and/or reduces dissolution of the CMAS resistant layer and/or underlying layers. In some examples, the RE metal cations may be selected to such that the CMAS resistant layer exhibits other beneficial properties such as a coefficient of thermal expansion (CTE) that is similar to that of the CTE of the underlying TBC layer. The properties of such a CMAS resistant layer may be different than a similar layer including only a single RE cation monosilicate composition.

In one example, the disclosure relates to an article comprising a substrate; a thermal barrier coating (TBC) layer on the substrate; and a CMAS resistant layer on the TBC layer, wherein the CMAS resistant layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

In another example, the disclosure relates to a method comprising forming a thermal barrier coating (TBC) layer on a substrate; and forming a CMAS resistant layer on the TBC layer, wherein the CMAS resistant layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

In another example, the disclosure relates to an article comprising a substrate; a thermal barrier coating (TBC) layer on the substrate; and a CMAS resistant layer on the TBC layer, wherein the CMAS resistant layer includes a rare-earth (RE) monosilicate composition including a plurality of RE metal cations, wherein RE monosilicate composition is configured to react with CMAS to form a reaction product including at least one of: a RE disilicate; aprimary apatite phase including a $M_2RE_8(SiO_4)_6O_2$ composition, where M is Ca, Mg, Al, Fe, Ti, Ni, K, Zr, Hf, and/or Na; or a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

In another example, the disclosure relates to a method comprising forming a thermal barrier coating (TBC) layer on a substrate; and forming a CMAS resistant layer on the TBC layer, wherein the CMAS resistant layer includes a rare-earth (RE) monosilicate composition including a plurality of RE metal cations, wherein RE monosilicate composition is configured to react with CMAS to form a reaction product including at least one of: a RE disilicate; a primary apatite phase including a $M_2RE_8(SiO_4)_6O_2$ composition, where M is Ca, Mg, Al, Fe, Ti, Ni, K, Zr, Hf, and/or Na; or a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
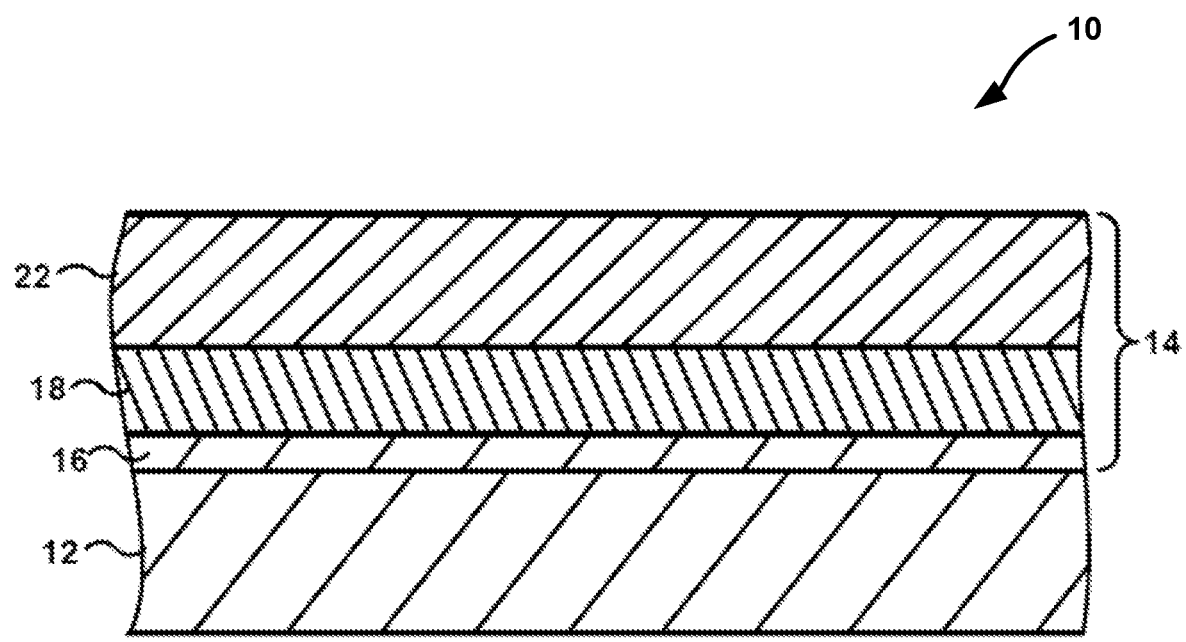
FIG. 1 is a conceptual diagram illustrating an example article including a substrate and a TBC coating system including a CMAS resistant layer in accordance with the disclosure.

The disclosure describes, in some examples, articles, systems, and techniques relating to TBC coating systems for metallic substrates, the coating systems including at least one TBC layer and a CMAS resistant layer overlying the TBC layer.

In the context of gas turbine engines, increasing demands for greater operating efficiency (e.g., fuel efficiency) has led to the operation of gas turbine engines at higher temperatures. In some examples, substrates, such as metallic substrates, of high-temperature mechanical systems are coated with a TBC system to provide thermal protection as well as environmental protection, in some instances, for the underlying substrate material(s) in a high temperature environment. In some examples, the topcoat for a TBC system may include a Yttria-stabilized zirconia (YSZ)-based TBC composition (e.g. 7YSZ) for vane and blade components of an engine and a YSZ-based TBC composition with a Mg-Spinel abradable coating for seal segments. The YSZ-based TBC composition may be applied via electron beam-physical vapor deposition (EB-PVD) or air plasma spraying (APS) while the Mg-Spinel may be applied via APS.

However, such coatings may be deleteriously attacked from CMAS due to the higher operating conditions of the engine and flying in regions with greater concentrations of CMAS on the ground and in the air. For example, increased operating temperatures, may lead to increased damage due to the presence of CMAS deposits within the high temperature environments. The presence of CMAS deposits in the high temperature environments of a gas turbine engine may result from the ingestion of siliceous minerals (e.g., airborne dust, sand, volcanic dust and ashes, fly ash, runway debris, concrete dust, fuel residue, and the like) in the intake gas drawn through the gas turbine engine. For example, when siliceous debris such as sand and dust is ingested into the engine, it can melt and deposit on coated hot section components (e.g. seal segments, vanes and blades). These partial or fully molten deposits are commonly referred to as calcium magnesium aluminosilicates ("CMAS") because the primary oxide constituents are CaO, MgO, Al¬2O3 and SiO2. Once molten CMAS has deposited on the surface of TBCs and/or abradable coatings, the CMAS may dissolve, react and/or infiltrate the coating system which leads to coating recession and/or spallation. Therefore, it may be preferable that coating systems including TBC and/or abradable coatings possess sufficient CMAS resistance to meet coating life requirements.

In accordance with examples of the disclosure, TBC systems may include a TBC layer and a CMAS resistant layer on the TBC, where the CMAS resistant layer includes a multi-RE cation monosilicate composition, e.g., where the monosilicate includes multiple different RE metal cations in its crystal lattice. The multi-RE cation monosilicate composition that includes multiple different RE metal cations may also be referred to herein as a "mixed RE monosilicate" composition. In some examples, the CMAS resistant layer is comprised of a mixed rare-earth (RE) monosilicate with up to three different RE metal cations $(RE1_xRE2_yRE3_z)_2SiO_5$ where $0.01 \leq x, y, z \leq 1$ and $x+y+z=1$. As described further below, in some examples, Gd and/or Nd monosilicate make up at least 30 mol % of the mixture (e.g. $(Gd_{0.3}Yb_{0.7})_2SiO_5$, $(Gd_{0.2}Nd_{0.1}Yb_{0.7})_2SiO_5$). In other examples, the mixed rare-earth (RE) monosilicate may have more than three RE metal cations and/or other RE metal cations other than that, or in addition to, Nd and/or Gd.

A mixed RE monosilicate composition, e.g., incorporating multiple different cations into the crystal lattice of the monosilicate phase, may provide for increased ability to tailor properties of the CMAS resistant layer (e.g., as compared to a layer containing silicate phase(s) with only a single metal cation). In some examples, the mixed RE monosilicate composition may be configured to react with a CMAS material, e.g., during operation of the coated article in a high temperature environment, to form a primary phase as well as a RE apatite phase, e.g., during operation of the article within a high temperature environment. The different RE metal cations of the mixed RE monosilicate composition may be selected such that the RE apatite phase formed from the reaction with CMAS is be stable over the operating temperature range of the article (e.g., from room temperature to about 1500 degrees Celsius). In some examples, in this manner, the CMAS resistant layer may as a barrier that reduces infiltration of the CMAS and/or reduces dissolution of the CMAS resistant layer and/or underlying layers.

In some examples, the RE metal cations may be selected to such that the CMAS resistant layer exhibits other beneficial properties such as a coefficient of thermal expansion (CTE) that is similar to that of the CTE of the underlying TBC layer. For example, the RE monosilicate composition may include Nd and/or Gd as one or more of the multiple RE metal cations in an mol percentage that results in the CMAS resistant layer having a CTE that is, e.g., within 2.5 ppm/K of any underlying TBC layer and/or substrate. The properties of such a CMAS resistant layer may be different than a similar layer including only a single RE cation monosilicate composition.

In some examples, the primary and/or apatite phases resulting from a reaction of the mixed RE monosilicate composition may depend on the composition of the CMAS material reacting with the mixed RE monosilicate composition. For example, when in contact with a $SiO_2$-lean CMAS composition (e.g. Ca:Si ratio (Ca/Si) equal to 0.73), the mixed RE monosilicate layer may be configured to react to form a primary apatite phase with the composition of $M_2RE_8(SiO_4)_6O_2$ where M is Ca, Mg, Al, Fe, Ti, Ni, K, Zr, Hf, and/or Na and a RE apatite phase with the composition of $xRE_2O_3 \cdot ySiO_2$ where the x:y ratio (x/y) is $0.5 < x/y < 1$ (e.g. $2RE_2O_3 \cdot 3SiO_2$). Conversely, when in contact with $SiO_2$-rich CMAS compositions (e.g. Ca:Si ratio (Ca/Si) equal to 0.37) the mixed RE monosilicate reacts to form a RE disilicate phase (primary phase) and/or a RE apatite phase (composition $xRE_2O_3 \cdot ySiO_2$ where the x:y ratio (x/y) is $0.5 < x/y < 1$ (e.g. $2RE_2O_3 \cdot 3SiO_2$).

In some examples, the reaction products of the reaction between the mixed RE monosilicate of the CMAS resistant layer and the CMAS material may be comprised of a single RE cation (e.g. $Ca_2Gd_8(SiO_4)_6O_2$, $2Gd_2O_3 \cdot 3SiO_2$, $Gd_2Si_2O_7$) or a mixture of up to three RE cations with varying molar concentrations of the RE cation (e.g. $Ca_2(Gd_{0.33},Nd_{0.33}Yb_{0.33})_8(SiO_4)_6O_2$, $2(Gd_{0.33},Nd_{0.33}Yb_{0.33})_2O_3 \cdot 3SiO_2$, $(Gd_{0.33},Nd_{0.33}Yb_{0.33})_2Si_2O_7$).

In some examples, the formation of a RE apatite acts as a secondary barrier (with the first barrier being the primary apatite and/or RE disilicate) to slow or reduce the CMAS infiltration and/or dissolution of the CMAS resistant coating and/or underlying coatings such as an underlying TBC layer. In some examples, RE silicates (e.g., RE silicates with only a single metal cation) that are capable of forming a RE apatite may only do so at temperatures greater than the operating conditions of the high temperature combustion engine (e.g., temperatures greater than or equal to 1600 degree Celsius (° C.)). In accordance with examples of the present disclosure, a mixed RE monosilicate composition may include RE metal cations that are selected such that the RE monosilicate composition forms a stable RE apatite phase throughout the entire operating range of the engine (e.g., about room temperature (e.g., about 23° C. to about 1500° C.) to beneficially provide the CMAS resistant properties described herein.

FIG. 1 is a conceptual diagram illustrating an example article 10 including a substrate 12 and a TBC coating system 14. TBC coating system 14 includes an optional bond coat 16, TBC layer 18, and CMAS resistant layer 22. In some examples, article 10 may include a component of a gas turbine engine. For example, article 10 may include a part that forms a portion of a flow path structure, a seal segment, a blade track, an airfoil, a blade, a vane, a combustion chamber liner, or another portion of a gas turbine engine.

Substrate 12 may include a material suitable for use in a high-temperature environment. In some examples, substrate 12 includes a superalloy including, for example, an alloy based on Ni, Co, Ni/Fe, or the like. In examples in which substrate 12 includes a superalloy material, substrate 12 may also include one or more additives such as titanium (Ti), cobalt (Co), or aluminum (Al), which may improve the mechanical properties of substrate 12 including, for example, toughness, hardness, temperature stability, corrosion resistance, oxidation resistance, or the like.

TBC coating system 14 on substrate 12 may provide thermal protection and/or CMAS resistance to substrate 12. For example, TBC coating system 14 includes TBC layer 18. TBC layer 18 may provide thermal cycling resistance, a low thermal conductivity, erosion resistance, combinations thereof, or the like. In some examples, TBC layer 18 may include zirconia or hafnia stabilized with one or more metal oxides, such as one or more rare earth oxides, alumina, silica, titania, alkali metal oxides, alkali earth metal oxides, or the like. For example, TBC layer 18 may include yttria-stabilized zirconia ($ZrO_2$) or yttria-stabilized hafnia, or zirconia or hafnia mixed with an oxide of one or more of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc).

As one example, TBC layer 18 may include a rare earth oxide-stabilized zirconia or hafnia layer including a base oxide of zirconia or hafnia and at least one rare-earth oxide, such as, for example, at least one oxide of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), or scandium (Sc). In some such examples, TBC layer 18 may include predominately (e.g., the main component or a majority) the base oxide including zirconia or hafnia mixed with a minority amount of the at least one rare-earth oxide.

TBC layer 18 may have any suitable thickness. While TBC layer 18 is shown at a single layer, in other examples, TBC coating system 14 may include multiple TBC layers having the same or different compositions.

As illustrated in FIG. 1, optional bond coat 16 of TBC coating system 14 is on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, as shown in FIG. 1, bond coat 16 of TBC coating system 14 may be directly on substrate 12. In other examples, one or more coatings or layers of coatings may be between bond coat 16 of TBC coating system 14 and substrate 12.

Bond coat 16 may be between TBC layer 18 and substrate 12 and may increase the adhesion of TBC layer 18 to substrate 12. Bond coat 16 may be in direct contact with substrate 12 and TBC layer 18. In some examples, bond coat 16 has a thickness of approximately 25 microns to approximately 250 microns, although other thicknesses are contemplated.

Bond coat 16 may include any suitable material configured to improve adhesion between substrate 12 and TBC layer 18. In some examples, bond coat 16 may include an alloy, such as an MCrAlY alloy (where M is Ni, Co, or NiCo), a β-NiAl nickel aluminide alloy (either unmodified or modified by Pt, Cr, Hf, Zr, Y, Si, and combinations thereof), a γ-Ni+γ'-$Ni_3Al$ nickel aluminide alloy (either unmodified or modified by Pt, Cr, Hf, Zr, Y, Si, and combination thereof), or the like. The composition of bond coat 16 may be selected based on the chemical composition and/or phase constitution of substrate 12 and the overlying layer (e.g., TBC layer 18 of FIG. 1). For example, if substrate 12 includes a superalloy with a γ-Ni+γ'-$Ni_3Al$ phase constitution, bond coat 16 may include a γ-Ni+γ'-$Ni_3Al$ phase constitution to better match the coefficient of thermal expansion of the superalloy substrate 12. In turn, the mechanical stability (e.g., adhesion) of bond coat 16 to substrate 12 may be increased.

In some cases, bond coat 16 may include a single layer or multiple layers having substantially the same or different compositions. In some examples, bond coat 16 includes multiple layers to provide multiple functions of bond coat 16, such as, for example, adhesion of substrate 12 to an overlying layer (e.g., TBC layer 18 of FIG. 1), chemical compatibility of bond coat 16 with each of substrate 12 and the overlying layer, a better coefficient of thermal expansion match of adjacent layers, or the like.

Bond coat 16 may be applied on substrate 12 using, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

TBC coating system 14 includes CMAS resistant layer 22, which may be configured to help protect substrate 12, TBC layer 18, and/or bond coat 16 against deleterious environmental species, such as CMAS and/or water vapor. As described herein, CMAS resistant layer 22 may include a mixed RE monosilicate composition with more than one RE metal cation, e.g., two, up to three, or more than three RE metal cations. For example, the CMAS resistant layer 22 may include a RE monosilicate composition that includes a plurality of different RE metal cations incorporated into the crystal lattice structure of the monosilicate phase. In some examples, the CMAS resistant layer is comprised of a mixed rare-earth (RE) monosilicate with up to three different RE metal cations $(RE1_xRE2_yRE3_z)_2SiO_5$ where $0.01 \leq x, y, z \leq 1$ and $x+y+z=1$ (e.g., where $0.05 \leq x, y, z \leq 0.95$). In some examples, the CMAS resistant layer is comprised of a mixed rare-earth (RE) monosilicate with two different RE metal cations $(RE1_xRE2_y)_2SiO_5$ where $0.01 \leq x, y \leq 1$ and $x+y=1$ (e.g., where $0.05 \leq x, y \leq 0.95$). Rare earth metals include lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and scandium (Sc). As described herein, in some examples, Gd and/or Nd monosilicate make up at least 30 mol % of the mixed RE monosilicate composition (e.g. $(Gd_{0.3}Yb_{0.7})_2SiO_5$, $(Gd_{0.2}Nd_{0.1}Yb_{0.7})_2SiO_5$). In some examples, La is one of the RE metal cations.

The mixed RE monosilicate composition of CMAS resistant layer 22 may provide for increased ability to tailor properties of the CMAS resistant layer (e.g., as compared to a layer containing silicate phase(s) with only a single metal cation). Tailoring of such properties may be achieved, e.g., by achieved by selecting the RE metal cations for the mixed RE monosilicate compositions described herein. One such example property is CMAS resistance. As noted above, under certain turbine operating conditions siliceous materials such as airborne dust, sand, fly ash and volcanic dust are ingested into the engine and accumulate on the hot surfaces of engine components (blade, vanes, combustion tiles and turbine segments) and melt when temperatures reach about 1200° C., depending on the composition of the deposit. Calcium Magnesium Alumino-Silicate (or CMAS) is the general name given to these molten deposits, as the predominant oxides are Calcia (CaO), Magnesia (MgO), Alumina ($Al_2O_3$) and Silica ($SiO_2$). In some examples, the composition of substrate 12, bond coat 16, and/or TBC layer 18 may be susceptible to CMAS attack, e.g., where molten CMAS may dissolve the respective layers and/or substrate. Without CMAS resistant layer 22, this process may ultimately lead to, e.g., spallation and/or partial or complete dissolution of TBC coating system 14 such as TBC layer 18.

In order to provide CMAS resistance, the mixed RE monosilicate composition of CMAS resistant layer 22 may be configured to react with a CMAS material, e.g., during operation of the coated article in a high temperature environment, to form a primary phase as well as a RE apatite phase, e.g., during operation of the article within a high temperature environment. The different RE metal cations of the mixed RE monosilicate composition may be selected such that the RE apatite phase formed from the reaction with CMAS is be stable over the operating temperature range of the article (e.g., from room temperature (e.g., about 23 degree Celsius) to about 1500 degrees Celsius). In some examples, in this manner, the CMAS resistant layer may as a barrier that reduces infiltration of the CMAS and/or reduces dissolution of the CMAS resistant layer and/or underlying layers.

In some examples, the primary and/or apatite phases resulting from a reaction of the mixed RE monosilicate composition of CMAS resistant layer 22 may depend on the composition of the CMAS material reacting with the mixed RE monosilicate composition. For example, when in contact with a $SiO_2$-lean CMAS composition (e.g. Ca:Si ratio (Ca/Si) equal to 0.73), the mixed RE monosilicate of CMAS resistant layer 22 may be configured to react to form a primary apatite phase with the composition of $M_2RE_8(SiO_4)_6O_2$ where M is Ca, Mg, Al, Fe, Ti, Ni, K, Zr, Hf, and/or Na and a RE apatite phase with the composition of $xRE_2O_3 \cdot ySiO_2$ where the x:y ratio (x/y) is $0.5<x/y<1$ (e.g. $2RE_2O_3 \cdot 3SiO_2$). Conversely, when in contact with $SiO_2$-rich CMAS compositions (e.g. Ca:Si ratio (Ca/Si) equal to 0.37) the mixed RE monosilicate of CMAS resistant layer 22 may react to form a RE disilicate phase (primary phase) and/or a RE apatite phase (the composition is $xRE_2O_3 \cdot ySiO_2$ where the x:y ratio (x/y) is $0.5<x/y<1$ (e.g. $2RE_2O_3 \cdot 3SiO_2$)).

In some examples, the reaction products of the reaction between the mixed RE monosilicate of CMAS resistant layer 22 and the CMAS material may be comprised of a single RE cation (e.g. $Ca_2Gd_8(SiO_4)_6O_2$, $2Gd_2O_3 \cdot 3SiO_2$, $Gd_2Si_2O_7$) or a mixture of up to three RE cations with varying molar concentrations of the RE cation (e.g. $Ca_2(Gd_{0.33},Nd_{0.33}Yb_{0.33})_8(SiO_4)_6O_2$, $2(Gd_{0.33},Nd_{0.33}Yb_{0.33})_2O_3 \cdot 3SiO_2$, $(Gd_{0.33},Nd_{0.33}Yb_{0.33})_2Si_2O_7$).

In some examples, the formation of a RE apatite acts as a secondary barrier (with the first barrier being the primary apatite and/or RE disilicate) to slow or reduce the CMAS infiltration and/or dissolution of the CMAS resistant coating and/or underlying coatings such as an underlying TBC layer. In some examples, RE silicates (e.g., RE silicates with only a single metal cation) that are capable of forming a RE apatite may only do so at temperatures greater than the operating conditions of the high temperature combustion engine (e.g., temperatures greater than or equal to 1600 degree Celsius (° C.)). In accordance with examples of the present disclosure, a mixed RE monosilicate composition may include RE metal cations that are selected such that the RE monosilicate composition forms a stable RE apatite phase at room temperature (about 23° C.) and/or throughout the entire operating range of the engine (e.g., room temperature above, about 23° C. to about 2000° C. or about 23° C. to about 1500° C.) to beneficially provide the CMAS resistant properties described herein. The RE apatite phase may be stable at the described temperature from about 1 to about 60 atmospheres.

In some examples, the RE metal cations may be selected to such that the CMAS resistant layer 22 exhibits other beneficial properties such as a coefficient of thermal expansion (CTE) that is similar to that of the CTE of the underlying TBC layer 18, e.g., so that CMAS resistant layer 22 exhibits desirable adhesion to TBC layer 18. In some examples, the CTE of CMAS resistant layer 22 may be about 7 ppm/K to about 13 ppm/K. In some examples, the difference in coefficient of thermal expansion between TBC layer 18 and CMAS resistant layer from about 0.5 ppm/K and about 3 ppm/K. In some examples, the CTE of CMAS resistant layer 22 may be within about 30% of TBC layer 18.

In some examples, the RE monosilicate composition of CMAS resistant layer 22 may include Nd and/or Gd as one or more of the multiple RE metal cations in an mol. % that results in the CMAS resistant layer having a desired CTE. In some examples, the molar concentration of Nd and/or Gd may be greater than 30% such as, e.g., greater than 50 mol. % to provide for a desired CTE match with TBC layer 18.

In some examples, the Gd and/or Nd monosilicate (CTE of about 8.5 to about 10.5 ppm/K) may be needed in the RE monosilicate mixture to improve thermal expansion (CTE) match to the TBC layer 18 (CTE of about 10 ppm/K) while other RE cation additions in the mixed RE monosilicate serve to increase the CMAS resistance of CMAS resistant layer 22. An example that demonstrates the benefit of multiple RE cations is the testing described below, where the CMAS resistance of a $(Gd_{0.5}La_{0.5})_2SiO_5$ layer was determined to be greater than its respective pure RE monosilicates. In some examples, the CTE of CMAS resistant layer 22 is preferably within +2.5 ppm/K of TBC layer 18. Mixed RE monosilicates comprised of multiple RE cations may have a lower thermal conductivity than their respective pure monosilicates (e.g., <2 W/m·K). Additional benefits of RE monosilicates include their stability in high temperature water vapor and chemical compatibility with yttria stabilized zirconia (YSZ).

In some examples, the thermal conductivity of CMAS resistant layer 22 may be modified, e.g., decreased or increased, as compared to a similar layer including a RE monosilicate composition but with only one metal cation in the monosilicate. In some examples, it may be preferred that CMAS resistant layer 22 exhibits a relatively low thermal conductivity, e.g., to provide thermal protection to substrate 12 and/or the other layers underlying CMAS resistant layer 22 during operation of article 10 in a high temperature environment. In this manner, CMAS resistant layer 22 may function as an additional thermal barrier layer to provide thermal protection to the underlying layer(s) and substrate 12. The incorporation of multiple RE metal cations into the monosilicate composition of CMAS resistant layer 22 may allow for the thermal conductivity of CMAS resistant layer 22 to be tailored or otherwise modified such that CMAS resistant layer 22 exhibits a desired level of thermal conductivity. In some examples, CMAS resistant layer 22 may have a thermal conductivity of less than approximately 2.5 W/m K, or a thermal conductivity of approximately 0.5 W/m K to approximately 2 W/m K.

CMAS resistant layer 22 may comprise, consist or consist essentially of the mixed RE monosilicate composition described herein. If a thermal spray process is used to form the mixed RE monosilicate, there may be some $SiO_2$ loss from spraying, so a mixed RE monosilicate may be present with other possible $SiO_2$—lean mixed RE silicate and/or mixed RE oxide. The coating may react with CMAS to form the phases mentioned described herein; primary apatite, RE apatite, RE disilicate, depending on the CMAS composition. Other minor phases such as garnet, diopside, albite, anthorite, melilite, cuspidine and/or wollastonite may form depending on the CMAS composition.

In some examples, CMAS resistant layer 22 may include one or more dopants, such as, $Al_2O_3$, $Fe_2O_3$, $Fe_3O_4$, $RE_2O_3$, $Ta_2O_5$, $HfO_2$, $ZrO_2$, $LiREO_2$ and/or $RE_3Al_5O_{12}$ (e.g. YbAG or YAG). The dopants may be added to the mixed RE monosilicate composition, e.g., up to about 15 mol. % or greater in some examples. These dopants may act as sintering aids that densify CMAS resistant layer 22 (e.g., to provide reduced porosity) which results in an increase in coating hermeticity (e.g., to slow oxidant transport through TBC coating system 14).

In some examples, CMAS resistant layer 22 may include only a single monosilicate phase, where the single monosilicate phase includes two or more RE metal cations in the crystal lattice structure of the single monosilicate phase. The number of RE metal cations in the crystal lattice structure may be two or more than two, such as three, or more than three RE metal cations. As another example, CMAS resistant layer 22 may include multiple monosilicate phases, where each monosilicate phase includes multiple RE cations incorporated into the crystal lattice structure of the monosilicate phase. Each of the multiple monosilicate phases may include the same RE metal cations in the crystal lattice structure, different RE metal cations in the crystal lattice structure, or some combination of the same and different RE metal cations in the crystal lattice structure. For example, in a system including a first monosilicate phase and a second monosilicate phase. The first silicate phase may incorporate RE metal cations "X" and "Y" and the second silicate phase may include RE metal cations "X" and "Y," may include RE metal cations "X" and "Z" or may include RE metal cations "Z" and "A". In the described example, metal cations X, Y, Z, and A do not refer to specific RE metal cations but only denote different RE metal cations.

The different RE metal cations may be present in each monosilicate phase in any suitable ratio. In some examples, for a monosilicate phase including only a first RE metal cation and a second RE metal cation incorporated into the crystal lattice structure, the first and second metal cations may be present in approximately a 1:1 molar ratio. In other examples, the monosilicate phase may include more of the first RE metal cation than the second RE metal cation or vice versa. In a monosilicate phase including first, second, and third metal RE cations, the first, second, and third RE cations may be present in approximately equal or equal amounts, different amounts, or first and second cations in approximately equal or equal amounts with the third cation being present in a greater or lesser amount that the first and second cation.

CMAS resistant layer 22 may be incorporated into a coating system such as TBC coating system 14 in any suitable manner, e.g., to protect the coating system and underlying substrate from damage due to CMAS being present in the operational environment. In the example of FIG. 1, CMAS resistant layer 22 is the top layer of TBC coating system 14 and it forms the outer surface of TBC coating system 14. In other examples, an optional RE apatite coating layer may be applied on top of CMAS resistant layer 22, e.g., to form the top layer of TBC coating system 14. In such an example, the optional RE apatite coating layer may include a RE apatite composition of $xRE_2O_3 \cdot ySiO_2$ where the x:y ratio (x/y) is 0.5<x/y<1 (e.g. $2RE_2O_3 \cdot 3SiO_2$). RE may be single or multiple RE cations.

Figure 2:
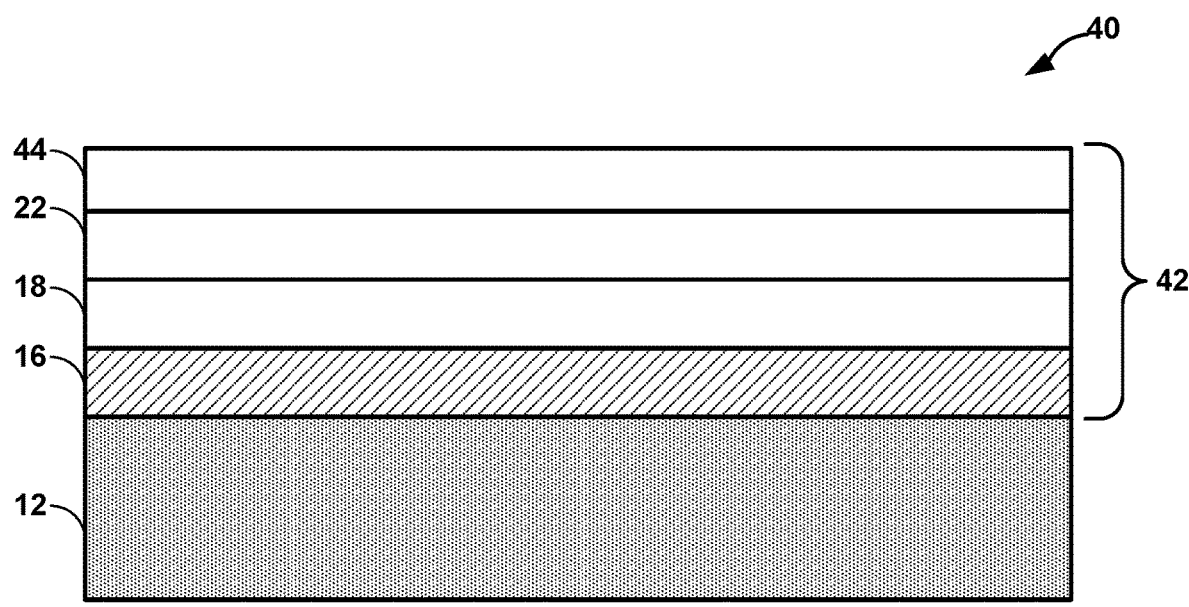
FIGS. 2-4 are conceptual diagrams illustrating various other example articles including a substrate and a TBC coating system including a CMAS resistant layer in accordance with the disclosure

Example coating system architectures are shown in FIGS. 1-4 where the mixed RE monosilicate CMAS resistant layer 22 may function as an additional TBC layer (e.g., as shown in FIG. 1) and/or an abradable coating (e.g., as shown in FIG. 2 described below). When serving as a TBC layer or abradable coating, the mixed RE monosilicate CMAS resistant layer 22 may have a porosity (or other void volume) ranging from, e.g., about 0.1 volume percent (vol. %) to about 8 vol. % and about 8 vol. % to about 50 vol. %, respectively. The microstructure of the layer may vary depending on the function of the mixed RE monosilicate CMAS resistant layer 22 (e.g., TBC function vs. abradable function) and the method used to deposit CMAS resistant layer 22. Example microstructures may include but are not limited to a splat, columnar or dense vertically cracked (DVC) microstructure.

As described below, the mixed RE monosilicate CMAS resistant layer 22 may be applied to TBC layer 18, e.g., a yttria stabilized zirconia layer, via a thermal spraying process (e.g., APS, suspension plasma spraying (SPS), HVOF, low pressure plasma spraying (LPPS), plasma spray-physical vapor deposition (PS-PVD), or the like), CVD, DVD, EB-PVD, electrophoretic deposition (EPD), slurry or sol-gel process. Some processing methods may yield a RE monosilicate that is $RE_2O_3$-rich (has more $RE_2O_3$ than stoichiometric RE monosilicate). It may also be desired to create a functionally graded mixed RE monosilicate layer where the $RE_2O_3$ content and/or porosity increases with layer thickness as you move away from TBC layer 18 (e.g., as in the example of FIG. 3 describe below). The mixed RE monosilicate CMAS resistant layer 22 may be applied on top of CMAS resistant layer 22 in two separate layers with different microstructures (e.g., as in the example of FIG. 2) or onto TBC layer 18 and function as an abradable coating (e.g., as in the example of FIG. 4). As described above, TBC layer 18 may be applied to metallic substrate 12 (e.g. a nickel-based superalloy substrate) and/or onto a metallic bond coat or other type bond coat (e.g., bond coat 16) that is adjacent to substrate 12. The metallic bond coat 16 may be comprised of a platinum aluminide or MCrAlY where M is one or more metals (e.g. NiCrAlY). TBC layer 18 and/or bond coat 16 may be deposited onto the metallic substrate using the same techniques described herein for the mixed RE monosilicate CMAS resistant layer 22.

FIG. 2 is a conceptual diagram illustrating another example article 40 including a substrate 12 and a TBC coating system 42. TBC coating system 42 and substrate 12 may be the same or substantially similar to that of TBC coating system 14 and substrate 12 of FIG. 1, and the layers of TBC coating system 42 are numbered similar to those of TBC coating system 14.

However, unlike that of article 10 shown in FIG. 1, TBC coating system 42 includes abradable layer 44 on CMAS resistant layer 22. In such a configuration, TBC coating system 42 may be configured such that abradable layer 44 has a greater porosity than TBC layer 18 and/or CMAS resistant layer 22, and the porosity of abradable layer 44 may be provided such that the outer surface of abradable layer 44 is abraded, e.g., when brought into contact with an opposing surface such as a blade tip. Abradable layer 44 may be on CMAS resistant layer 22, which may provide for better adhesion of abradable layer 44 to TBC layer 18, optional bond coat 16 and/or substrate 12. In some examples, abradable layer 44 may define a thickness between about 0.005 inches (about 127 micrometers) and about 0.100 inches (about 2540 micrometers). In other examples, abradable layer 44 may have a different thickness.

The composition of abradable layer 44 may be the same or substantially similar to that of CMAS resistant layer 22. As described above for CMAS resistant layer 22, abradable layer 44 may include a mixed RE monosilicate composition, where the monosilicate includes more than one RE metal cation incorporated into the crystal lattice structure of the silicate phase.

CMAS resistant layer 22 may have a porosity or other void volume that is less than abradable layer 44. When configured as a non-abradable layer, CMAS resistant layer 22 may include a porosity of, e.g., about 0.1 volume percent (vol. %) to about 8 vol. %, where porosity is measured as a percentage of pore volume divided by total volume of CMAS resistant layer 22. When configured as an abradable layer, CMAS resistant layer 22 may include a porosity of, e.g., about 8 volume percent (vol. %) to about 50 vol. %, where porosity is measured as a percentage of pore volume divided by total volume of CMAS resistant layer 22. In each case, the porosity of TBC layer 18 and CMAS resistant layer 22 may be measured using mercury porosimetry, optical microscopy or Archimedean method.

In some examples, the porosity of CMAS resistant layer 22 and abradable layer 44 may be created and/or controlled by plasma spraying the coating material using a co-spray process technique in which the coating material and a coating material additive are fed into a plasma stream with two radial powder feed injection ports. The feed pressures and flow rates of the coating material and coating material additive may be adjusted to inject the material on the outer edge of the plasma plume using direct 90-degree angle injection. This may permit the coating material particles to soften but not completely melt, and the coating material additive to not burn off, but rather soften sufficiently for adherence within TBC coating system 42.

In other examples, the porosity of CMAS resistant layer 22 and abradable layer 44 may be controlled by the use of coating material additives and/or processing techniques to create the desired porosity. For example, to form abradable layer 44 of TBC coating system 42 in FIG. 2, a fugitive material that melts or burns at the use temperatures of the component (e.g., a blade track) may be incorporated into the coating material that forms abradable layer 44. The fugitive material may include, for example, graphite, hexagonal boron nitride, or a polymer such as a polyester, and may be incorporated into the coating material prior to deposition of the coating material on substrate 12 to form abradable layer 44. The fugitive material then may be melted or burned off in a post-formation heat treatment, or during operation of the gas turbine engine, to form pores in TBC coating system 42.

In some examples in which CMAS resistant layer 22 and/or abradable layer 44 has a columnar microstructure, CMAS resistant layer 22 and/or abradable layer 44 may be deposited on substrate 12 using a SPS technique, an EB-PVD technique, a plasma spray physical vapor deposition (PSPVD) technique, or a directed vapor deposition (DVD) technique. In some examples, TBC layer 18 or CMAS resistant layer 22 including a columnar microstructure may include a dense vertically cracked (DVC) coating, which in some cases, may be deposited on substrate 12 using an air plasma spray technique.

Figure 3:
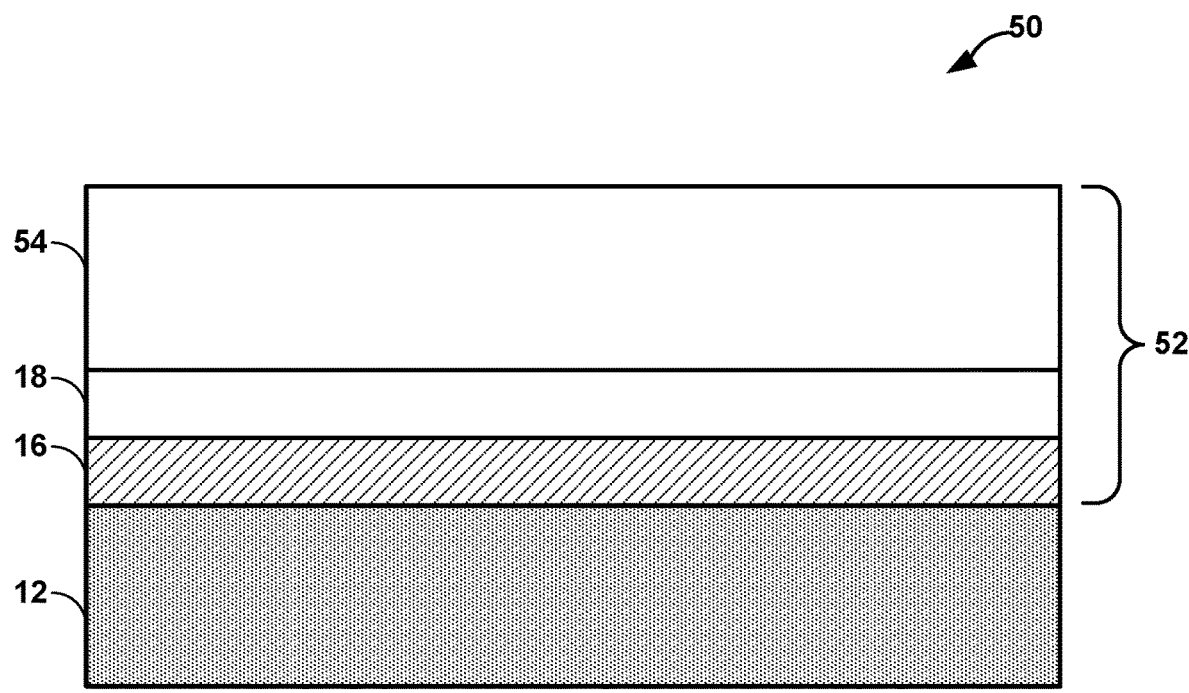

FIG. 3 is a conceptual diagram illustrating another example article 50 including a substrate 12 and a TBC coating system 52. TBC coating system 52 and substrate 12 may be the same or substantially similar to that of TBC coating system 14 and substrate 12 of FIG. 1, and the layers of TBC coating system 52 are numbered similar to those of TBC coating system 14.

However, unlike that of article 10 shown in FIG. 1, TBC coating system 52 includes graded CMAS resistant layer 54 on TBC layer 18. Graded CMAS resistant layer 54 may include a mixed RE monosilicate composition like that described for CMAS resistant layer 22. In the example of FIG. 3, graded CMAS resistant layer 54 may have a graded composition and/or graded porosity, e.g., along the thickness of graded CMAS resistant layer 54, rather than being substantially uniform in composition and/or porosity along the thickness. For example, the porosity of graded CMAS resistant layer 54 may be graded such that the porosity decreases moving from top surface of graded CMAS resistant layer 54 to top surface of TBC layer 18. In some examples, graded CMAS resistant layer 54 may exhibit a relatively high porosity near top surface like that described for abradable layer 44 of TBC coating system 42 (FIG. 2) and a lower porosity adjacent to top surface of TBC layer 18 like that described for CMAS resistant layer 22 of TBC coating system 14. In this manner, the upper portion of graded CMAS resistant layer 54 may still function as an abradable layer and the lower portion of graded CMAS resistant layer 54 may provide better thermal and/or CMAS protection and/or CTE match for TBC coating system 52 and/or substrate 12.

Additionally, or alternatively, graded CMAS resistant layer 54 may be compositionally graded, e.g., with varying amounts of $RE_2O_3$ content along the thickness of graded CMAS resistant layer 54. For example, relatively low amounts of $RE_2O_3$ content may be present at the interface between graded CMAS resistant layer 54 and TBC layer 18. The $RE_2O_3$ content may increase from that interface to the top surface of graded CMAS resistant layer 54. The grading may be selected so there is a good CTE match at the interface between graded CMAS resistant layer 54 and TBC layer 18, and/or increase the monosilicate going towards the surface of graded CMAS resistant layer 54 for better water vapor and CMAS resistance. In some examples, the porosity of the graded CMAS layer 54 may be selected for near the top of the layer so that graded CMAS resistant layer 54 serves as an abradable coating.

The gradient in graded CMAS resistant layer 54 may be a substantially continuous gradient or it may be accomplished by depositing multiple layer with different compositions and/or porosity. For example, graded CMAS resistant layer 54 may be formed by depositing two sub-layers, with each sub-layer having a different porosity and/or a different composition to accomplish the compositional grading and porosity grading described herein.

Figure 4:
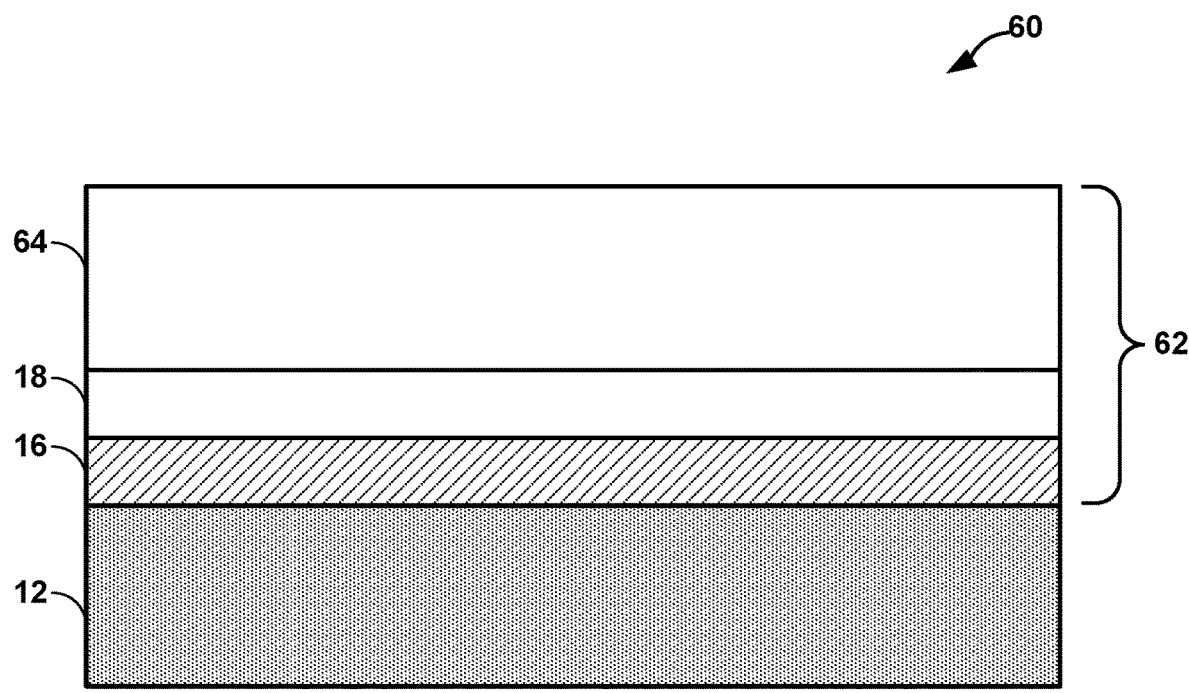

FIG. 4 is a conceptual diagram illustrating another example article 60 including a substrate 12 and a TBC coating system 62. TBC coating system 62 and substrate 12 may be the same or substantially similar to that of TBC coating system 14 and substrate 12 of FIG. 1, and the layers of TBC coating system 62 are numbered similar to those of TBC coating system 14.

However, unlike that of article 10 shown in FIG. 1, TBC coating system 62 includes abradable CMAS resistant layer 64 on TBC layer 18. Abradable CMAS resistant layer 64 may be substantially the same as abradable layer 44 in TBC coating system 42 of FIG. 2 but, unlike that of TBC coating system 42 of FIG. 2, TBC coating system 62 does not include a more dense and/or less porous CMAS resistant layer like CMAS resistant layer 22 between abradable CMAS resistant layer 64 and TBC layer 18. Rather, as shown in FIG. 4, abradable CMAS resistant layer 64 may be directly on TBC layer 18. Like that described for abradable layer 44, abradable CMAS resistant layer 64 may have a porosity or other void volume of about 8 vol. % to about 50 vol. %.

Figure 5:
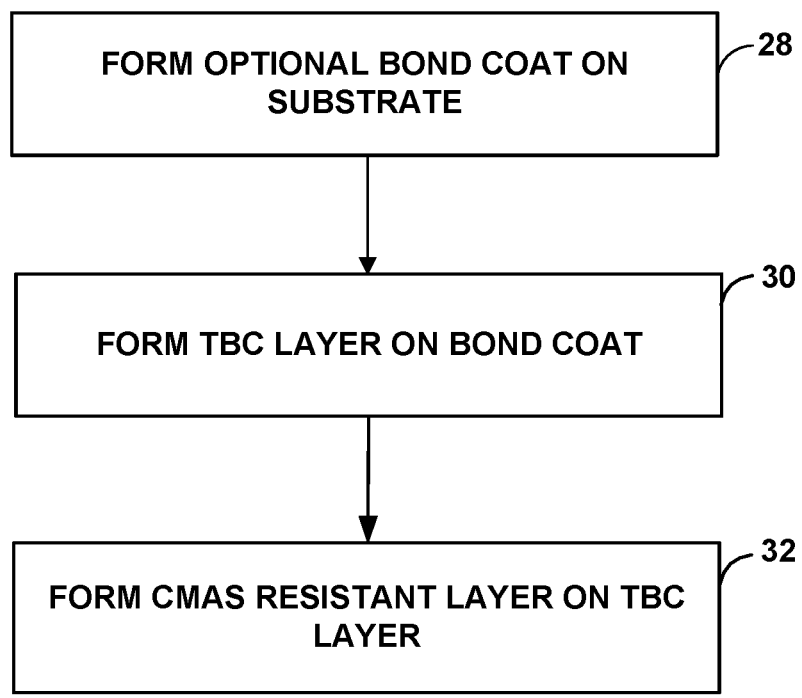
FIG. 5 is a flow diagram illustrating an example technique of forming an article including a TBC coating system in accordance with the disclosure.

FIG. 5 is a flow diagram illustrating an example technique of forming an article including a substrate and a TBC coating system including at least one CMAS resistant layer on a TBC layer. The technique of FIG. 5 will be described with respect to article 10 of FIG. 1 for ease of description. However, in other examples, the technique of FIG. 5 may be used to form articles other than article 10 of FIG. 1, such as articles 40, 50, and 60 described herein.

The example technique of FIG. 5 optionally includes forming bond coat 16 on substrate 12 of article 10 (28). Forming bond coat 16 may include, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like. Bond coat 16 may have a composition such as those described above. Bond coat 16 may promote bonding or retention of subsequently deposited or applied layers, for example, TBC layer 18 and CMAS resistant layer 22, on substrate 12.

The example technique of FIG. 5 includes forming TBC layer 18 on bond coat 16 (30). TBC layer 18 may be have a composition such as that described herein and may be deposited using any suitable technique, such as, e.g., via a thermal spraying process (e.g., APS, suspension plasma spraying (SPS), HVOF, low pressure plasma spraying (LPPS), plasma spray-physical vapor deposition (PS-PVD), or the like), CVD, DVD, EB-PVD, electrophoretic deposition (EPD), slurry or sol-gel process.

Following the formation of TBC layer 18, CMAS resistant layer 22 may be formed on TBC layer 18 (32). CMAS resistant layer 22 may be formed using any of the suitable techniques described herein, such, as via thermal spraying process (e.g., APS, suspension plasma spraying (SPS), HVOF, low pressure plasma spraying (LPPS), plasma spray-physical vapor deposition (PS-PVD), or the like), CVD, DVD, EB-PVD, electrophoretic deposition (EPD), slurry or sol-gel process. The CMAS resistant layer 22 may include a mixed RE monosilicate composition consistent with the examples described herein.

In some examples, the technique of FIG. 5 may include mixing selected RE monosilicate powders with each other as part of the formation of mixed RE monosilicate CMAS resistant layer 22. The selected RE monosilicate powders may be monosilicate powders, where each monosilicate powder is a silicate with a single cation of the desired final product for mixed RE monosilicate composition of CMAS resistant layer 22, e.g., with more than one RE cation incorporated into the crystal lattice of the mixed RE monosilicate composition. For example, the monosilicate powders that are mixed with each other may include a single RE earth metal cation. In one example, the silicate powders may all be rare earth monosilicates such as $Gd_2SiO_5$, $Nd_2SiO_5$, and $La_2SiO_5$ powders as described below. For example, starting with powders of single rare earth cation, those starting powders may be mixed to form one or more RE monosilicate phases with any ratio and number of multiple RE cations.

The amount of each RE monosilicate powder in the starting components may be present in any suitable amount to provide for a desired monosilicate phase composition of CMAS resistant layer 22 such as the composition of CMAS resistant layer 22 described above. In some examples, each of the monosilicate powders mixed with each may be present in an approximately 1:1 molar ratio (e.g., a substantially equimolar ratio of the monosilicate powders) or may be in a non-equimolar ratio. In some examples, the Gd and/Nb monosilicate(s) may be present in at least 30 mol. % of the entire mixture, as described above.

The mixing of the monosilicate powder may be carried out using any suitable technique. In some examples, the mixing process may include high energy ball milling or other mechanical mixing technique. As another example, liquid precursor processing, such as liquid precursor processing used for individual RE monosilicates, may be used. For example, liquid precursors like nitrates may be used as starting materials and mixed in the liquid state, then dried/heat treated to form mixed powders. In the case of a precursor for a plasma spray process, the individual powder could be mixed together using spray drying methods.

The mixed RE monosilicate powders may then be applied directly on TBC layer 18 to form CMAS resistant layer 22 (32). CMAS resistant layer 22 may be applied on TBC layer 18 using any one or more of a wide variety of coating techniques, including, for example, via a thermal spraying process (e.g., APS, suspension plasma spraying (SPS), HVOF, low pressure plasma spraying (LPPS), plasma spray-physical vapor deposition (PS-PVD), or the like), CVD, DVD, EB-PVD, electrophoretic deposition (EPD), slurry or sol-gel process. In some examples, the mixture of powders may be deposited on TBC layer 18 to form a layer and then quenched to form a single RE monosilicate phase with multiple RE metal cations or a plurality of mono silicate phases each with multiple RE cations, where the number of RE monosilicate phases is less than the number of starting RE monosilicate powder phases.

Prior to mixing, the respective silicate powers may each define a distinct RE monosilicate phase, with each silicate only including a single RE cation. After mixing and application onto TBC layer 18 to form CMAS resistant layer 22, the powders may form a single RE monosilicate phase including more than one RE cation (e.g., the single monosilicate phase may include the RE cation of each of the distinct monosilicate powder phases) or multiple monosilicate phases each including multiple RE cations (e.g., each of the monosilicate phases may include the RE cation of each of the distinct RE monosilicate powder phases or at least multiple RE cations from the distinct monosilicate powder phases). In the case of the multiple monosilicate phases, the number of monosilicate phases of CMAS resistant layer 22 may be less than the number of distinct powder phases in the original mixture. For example, if three monosilicate powders are mixed and applied to TBC layer 18, CMAS resistant layer 22 may include less three monosilicate phases, with each phase including three different RE cations from the three different monosilicate powders.

While the example technique of FIG. 2 may include a separate step for mixing the monosilicate powders prior to application of the mixture on TBC layer 18, in other examples, the application process may include thermal spraying or other techniques in which the powders are additionally or alternatively mixed upon contact with TBC layer 18. In some thermal spraying techniques, the powders may be initially mixed with each other before thermal spraying and then further mixed with each other upon contact with the substrate. In some examples, slurry based or liquid mixing processes may also be used to form CMAS resistant layer 22, and may include mixing of the powder prior to application on TBC layer 18. In some examples, a fusing process may be employed that melts and mixes the silicates prior to coating. After fusing, the melt may be crushed to the particle size desired for application to the substrate.

In some examples, the particles/powders may be pre-alloyed, e.g., with the RE monosilicates being mixed (pre reacted), and/or may be a mixture containing separate particles of RE monosilicates, and/or may be the individual material powders co-sprayed which each other (e.g., where the individual material powders are fed into the thermal spray torch separately and mix in the thermal spray torch/plasma).

Although not shown, in some examples, CMAS resistant layer 22 may be heat treated following the formation on TBC layer 18. For example, the as-deposited CMAS resistant layer may be comprised of amorphous and crystalline phases (e.g., about 10 vol. % to about 90 vol. % amorphous, e.g., about 40 vol. % amorphous). A heat treatment is performed to transform at least a portion of the amorphous phase to a crystalline phase.

Examples

As series of tests were performed to evaluate one or more aspects of some examples of the disclosure. However, the disclosure is not limited by the tests.

A first sample was prepared by forming a layer of Gd monosilicate, a single RE cation monosilicate composition. A second sample was prepared by forming a layer of La monosilicate, another single RE cation monosilicate composition. A third sample was prepared by forming a layer of (Gd,La) monosilicate, a mixed RE monosilicate. Each of the samples was then reacted with a CMAS composition. It was determined that the CMAS resistance of the mixed RE monosilicate composition was greater than the CMAS resistance of the single RE monosilicates. It was determined that the CTE of the mixed RE monosilicate composition was different than the CTE of the single RE monosilicates.

Various examples have been described. These and other examples are within the scope of the following claims and clauses.

Clause 1. An article comprising: a substrate; a thermal barrier coating (TBC) layer on the substrate; and a CMAS resistant layer on the TBC layer, wherein the CMAS layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO$ composition, wherein the RE of the $RE_2O_3 \cdot SiO$ composition includes at least one of the plurality of RE metal cations of the RE monosilicate.

Clause 2. The article of clause 1, wherein the $RE_2O_3 \cdot SiO$ composition includes a $xRE_2O_3 \cdot ySiO_2$ composition, where a x:y ratio (x/y) is $0.5 < x/y < 1$.

Clause 3. The article of clauses 1 or 2, wherein the reaction product formed by the reaction of the RE monosilicate composition with the CMAS includes a primary apatite phase including at least one of the plurality of RE metal cations of the RE monosilicate.

Clause 4. The article of clause 3, wherein the CMAS includes a $SiO_2$-lean CMAS composition, and wherein the primary apatite phase formed by the reaction includes a $M_2RE_8(SiO_4)_6O_2$ composition, where M is Ca, Mg, Al, Fe, Ti, Ni, K, Zr, Hf, and/or Na.

Clause 5. The article of clause for 2, wherein the CMAS includes a $SiO_2$-rich CMAS composition, and wherein the reaction product formed by the reaction of the RE monosilicate composition with the CMAS includes a RE disilicate composition.

Clause 6. The article of any one of clauses 1-5, wherein the RE monosilicate composition includes at least one of Nd monosilicate or Gd monosilicate.

Clause 7. The article of clause 6, wherein an amount of the at least one of the Nd monosilicate or the Gd monosilicate is such that the CMAS resistant layer exhibits a coefficient of thermal expansion (CTE) that is within about 30% of the TBC layer.

Clause 8. The article of clauses 6 or 7, wherein the RE monosilicate composition includes at least 30 mol percent of the at least one of the Nd monosilicate or the Gd monosilicate.

Clause 9. The article of any one of clauses 1-8, wherein the reaction product includes a single RE metal cation of the plurality of metal cations of the RE monosilicate composition.

Clause 10. The article of any one of clauses 1-8, wherein the reaction product includes more than one RE metal cation of the plurality of metal cations of the RE monosilicate composition.

Clause 11. The article of any one of clauses 1-10, wherein the plurality of RE metal cations is three RE metal cations.

Clause 12. The article of any one of clauses 1-11, wherein the RE monosilicate composition is configured such that the RE apatite phase is stable from approximately 23 degrees Celsius to about 2000 degrees Celsius.

Clause 13. The article of any one of clauses 1-12, wherein the RE apatite phase is configured to act as a barrier that reduces infiltration of the CMAS and/or reduces dissolution of the CMAS resistant layer to protect the TBC layer.

Clause 14. The article of any one of clauses 1-13, wherein the CMAS resistant layer consists essentially of the RE monosilicate.

Clause 15. The article of any one of clauses 1-13, wherein the CMAS resistant layer includes one or more dopants configured to reduce the void volume of the CMAS resistant layer.

Clause 16. The article of any one of clauses 1-13, wherein the CMAS resistant layer includes a $SiO_2$—lean mixed RE silicate and/or mixed RE oxide.

Clause 17. The article of any one of clauses 1-16, wherein the CMAS resistant layer is configured as an abradable layer on the TBC layer.

Clause 18. The article of any one of clauses 1-17, wherein the CMAS resistant layer exhibits a void volume of about 8 percent to about 50 percent.

Clause 19. The article of any one of clauses 1-17, wherein the CMAS resistant layer exhibits a void volume of about 0.1 percent to about 8 percent.

Clause 20. The article of any one of clauses 1-19, wherein the CMAS resistant layer include a first sub-layer and a second sub-layer, the first and second sub-layers having different microstructure.

Clause 21. The article of any one of clauses 1-20, further comprising a bond coat between the TBC layer and the substrate.

Clause 22. The article of any one of clauses 1-21, wherein the plurality of RE metal cations includes three RE metal cations.

Clause 23. The article of any one of clauses 1-21, wherein the plurality of RE metal cations includes two RE metal cations.

Clause 24. A method comprising: forming a thermal barrier coating (TBC) layer on a substrate; and forming a CMAS resistant layer on the TBC layer, wherein the CMAS layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

Clause 25. The method of clause 24, wherein the $RE_2O_3 \cdot SiO_2$ composition includes a $xRE_2O_3 \cdot ySiO_2$ composition, where a x:y ratio (x/y) is $0.5 < x/y < 1$.

Clause 26. The method of clauses 24 or 25, wherein the reaction product formed by the reaction of the RE monosilicate composition with the CMAS includes a primary apatite phase including at least one of the plurality of RE metal cations of the RE monosilicate.

Clause 27. The method of clause 3, wherein the CMAS includes a $SiO_2$-lean CMAS composition, and wherein the primary apatite phase formed by the reaction includes a $M_2RE_8(SiO_4)_6O_2$ composition, where M is Ca, Mg, Al, Fe, Ti, Ni, K, Zr, Hf, and/or Na.

Clause 28. The method of clause 24 or 25, wherein the CMAS includes a $SiO_2$-rich CMAS composition, and wherein the reaction product formed by the reaction of the RE monosilicate composition with the CMAS includes a RE disilicate composition.

Clause 29. The method of any one of clauses 24-28, wherein the RE monosilicate composition includes at least one of Nd monosilicate or Gd monosilicate.

Clause 30. The method of clause 29, wherein an amount of the at least one of the Nd monosilicate or the Gd monosilicate is such that the CMAS resistant layer exhibits a coefficient of thermal expansion (CTE) that is within about 30% of the TBC layer.

Clause 31. The method of clauses 29 or 30, wherein the RE monosilicate composition includes at least 30 mol percent of the at least one of the Nd monosilicate or the Gd monosilicate.

Clause 32. The method of any one of clauses 24-31, wherein the reaction product includes a single RE metal cation of the plurality of metal cations of the RE monosilicate composition.

Clause 33. The method of any one of clauses 24-31, wherein the reaction product includes more than one RE metal cation of the plurality of metal cations of the RE monosilicate composition.

Clause 34. The method of any one of clauses 24-33, wherein the plurality of RE metal cations is three RE metal cations.

Clause 35. The method of any one of clauses 24-34, wherein the RE monosilicate composition is configured such that the RE apatite phase is stable from approximately 23 degrees Celsius to about 2000 degrees Celsius.

Clause 36. The method of any one of clauses 24-35, wherein the RE apatite phase is configured to act as a barrier that reduces infiltration of the CMAS and/or reduces dissolution of the CMAS resistant layer to protect the TBC layer.

Clause 37. The method of any one of clauses 24-36, wherein the CMAS resistant layer consists essentially of the RE monosilicate.

Clause 38. The method of any one of clauses 24-37, wherein the CMAS resistant layer includes one or more dopants configured to reduce the void volume of the CMAS resistant layer.

Clause 39. The method of any one of clauses 24-37, wherein the CMAS resistant layer includes a $SiO_2$—lean mixed RE silicate and/or mixed RE oxide.

Clause 40. The method of any one of clauses 24-39, wherein the CMAS resistant layer is configured as an abradable layer on the TBC layer.

Clause 41. The method of any one of clauses 24-40, wherein the CMAS resistant layer exhibits a void volume of about 8 percent to about 50 percent.

Clause 42. The method of any one of clauses 24-40, wherein the CMAS resistant layer exhibits a void volume of about 0.1 percent to about 8 percent.

Clause 43. The method of any one of clauses 24-42, wherein the CMAS resistant layer include a first sub-layer and a second sub-layer, the first and second sub-layers having different microstructure.

Clause 44. The method of any one of clauses 24-43, further comprising a bond coat between the TBC layer and the substrate.

Clause 45. The method of any one of clauses 24-44, wherein the plurality of RE metal cations includes three RE metal cations.

Clause 46. The method of any one of clauses 24-44, wherein the plurality of RE metal cations includes two RE metal cations.

Clause 47. A method comprising forming an article according to any one of clauses 1-23.

Clause 48. An article comprising: a substrate; a thermal barrier coating (TBC) layer on the substrate; and a CMAS resistant layer on the TBC layer, wherein the CMAS layer includes a rare-earth (RE) monosilicate composition including a plurality of RE metal cations, wherein RE monosilicate composition is configured to react with CMAS to form a reaction product including at least one of: a RE disilicate; a primary apatite phase including a $M_2RE_8(SiO_4)_6O_2$ composition, where M is Ca, Mg, Al, Fe, Ti, Ni, K, Zr, Hf, and/or Na; or a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

Clause 49. A method comprising: forming a thermal barrier coating (TBC) layer on a substrate; and forming a CMAS resistant layer on the TBC layer, wherein the CMAS layer includes a rare-earth (RE) monosilicate composition including a plurality of RE metal cations, wherein RE monosilicate composition is configured to react with CMAS to form a reaction product including at least one of: a RE disilicate; a primary apatite phase including a $M_2RE_8(SiO_4)_6O_2$ composition, where M is Ca, Mg, Al, Fe, Ti, Ni, K, Zr, Hf, and/or Na; or a RE apatite phase with a $RE_2O_3 \cdot SiO_2$ composition, wherein the RE of the $RE_2O_3 \cdot SiO_2$ composition includes at least one of the plurality of RE metal cations of the RE monosilicate.

What is claimed is:

1. An article comprising:
   a substrate comprising a metal or an alloy;
   a thermal barrier coating (TBC) layer on the substrate comprising a rare earth oxide stabilized zirconia or hafnia and defines a coefficient of thermal expansion of about 10 ppm/K; and
   a CMAS resistant layer on the TBC layer, wherein the CMAS resistant layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate composition,
   wherein the RE monosilicate composition includes at least 30 mol percent of at least one of neodymium monosilicate or gadolinium monosilicate such that a coefficient of thermal expansion (CTE) of the CMAS resistant layer is within about 30% of the TBC layer.

2. The article of claim 1, wherein the $RE_2O_3 \cdot SiO_2$ composition includes a $xRE_2O_3 \cdot ySiO_2$ composition, where a x:y ratio (x/y) is $0.5 < x/y < 1$.

3. The article of claim 1, wherein the reaction product formed by the reaction of the RE monosilicate composition with the CMAS includes a primary apatite phase with a composition of $M_2RE_8(SiO_4)_6O_2$, wherein M is Ca, Mg, Al, Fe, Ti, Ni, K, Zr, Hf, and/or Na, and wherein RE includes at least one of the plurality of RE metal cations of the RE monosilicate.

4. The article of claim 1, wherein the reaction product includes a single RE metal cation of the plurality of metal cations of the RE monosilicate composition.

5. The article of claim 1, wherein the reaction product includes more than one RE metal cation of the plurality of metal cations of the RE monosilicate composition.

6. The article of claim 1, wherein the plurality of RE metal cations is three RE metal cations.

7. The article of claim 1, wherein the RE monosilicate composition is configured such that the RE apatite phase is stable from approximately 23 degrees Celsius to about 2000 degrees Celsius.

8. The article of claim 1, wherein the RE apatite phase is configured to act as a barrier that reduces infiltration of the CMAS and/or reduces dissolution of the CMAS resistant layer to protect the TBC layer.

9. The article of claim 1, wherein the CMAS resistant layer includes a $SiO_2$—lean mixed RE silicate and/or mixed RE oxide.

10. The article of claim 1, wherein the CMAS resistant layer exhibits a void volume of about 8 percent to about 50 percent.

11. The article of claim 1, wherein the CMAS resistant layer exhibits a void volume of about 0.1 percent to about 8 percent.

12. The article of claim 1, wherein the CMAS resistant layer include a first sub-layer and a second sub-layer, the first and second sub-layers having different microstructure.

13. The article of claim 1, wherein the CMAS resistant layer includes one or more dopants configured to reduce the void volume of the CMAS resistant layer, wherein the dopants include at least one of $Al_2O_3$, $Fe_2O_3$, $Fe_3O_4$, $RE_2O_3$, $Ta_2O_5$, $HfO_2$, $ZrO_2$, CaO, MgO, SrO, $LiREO_2$ or $RE_3Al_5O_{12}$.

14. A method comprising:
   forming a thermal barrier coating (TBC) layer on a substrate, wherein the substrate comprises a metal or an alloy and the TBC layer comprises a rare earth oxide stabilized zirconia or hafnia and defines a coefficient of thermal expansion of about 10 ppm/K; and
   forming a CMAS resistant layer on the TBC layer, wherein the CMAS resistant layer includes a rare-earth (RE) monosilicate composition including a plurality of RE metal cations, wherein RE monosilicate composition is configured to react with CMAS to form a reaction product including a RE apatite phase with a $RE_2O_3 \cdot SiO_2$ composition, wherein the RE of the $RE_2O_3 \cdot SiO_2$ composition includes at least one of the plurality of RE metal cations of the RE monosilicate composition,
   wherein the RE monosilicate composition includes at least 30 mol percent of at least one of neodymium monosilicate or gadolinium monosilicate such that a coefficient of thermal expansion (CTE) of the CMAS resistant layer is within about 30% of the TBC layer.

15. An article comprising:
   a substrate comprising a metal or an alloy;
   a thermal barrier coating (TBC) layer on the substrate comprising a rare earth oxide stabilized zirconia or hafnia and defines a coefficient of thermal expansion of about 10 ppm/K; and
   a CMAS resistant layer on the TBC layer, wherein the CMAS resistant layer includes a rare-earth (RE) monosilicate composition including a plurality of RE metal cations, wherein RE monosilicate composition is configured to react with CMAS to form a reaction product including at least one of: a RE disilicate; a primary apatite phase including a $M_2RE_8(SiO_4)_6O_2$ composition, where M is Ca, Mg, Al, Fe, Ti, Ni, K, Zr, Hf, and/or Na; or a RE apatite phase with a $RE_2O_3 \cdot SiO_2$ composition, wherein the RE of the $RE_2O_3 \cdot SiO_2$ composition includes at least one of the plurality of RE metal cations of the RE monosilicate composition,
   wherein the RE monosilicate composition includes at least 30 mol percent of at least one of neodymium monosilicate or gadolinium monosilicate such that a coefficient of thermal expansion (CTE) of the CMAS resistant layer is within about 30% of the TBC layer.

* * * * *